United States Patent

[11] 3,567,132

[72] Inventors Andrei Nikolaevich Shashkov
Lomonksovsky prospekt, 23, kv. 550;
Jury Ivanovich Nekrasov, Novo-
Rogozhskaya ul, 5, kv. 125; Leonid
Petrovich Guskov, Boitsoraya ul. 10 Korp
8, kv. 43; Nina Lvovna Frolova, 3,
Peschanaya ul, 1, kv. 139; Vladimir
Nikoaevich Potapov, ul. Junykn Lenintser,
69, kv. 50; Jury Konstantinovich Rodin, ul.
Kolyaeva, 4, kv. 15, Moscow, U.S.S.R.
[21] Appl. No. 752,038
[22] Filed Aug. 12, 1968
[45] Patented Mar. 2, 1971

[54] GAS TORCH FOR WELDING PREFERABLY FUSIBLE MATERIALS, SUCH AS PLASTICS AND FOR SOLDERING SOFT ALLOYS
2 Claims, 3 Drawing Figs.
[52] U.S. Cl. .................................................. 239/405,
239/413
[51] Int. Cl. ...................................................... B05b 7/04

[50] Field of Search ........................................... 239/399,
403, 404, 405, 406, 416.5, 417.3, 419

[56] References Cited
UNITED STATES PATENTS
| | | | |
|---|---|---|---|
| 1,365,600 | 1/1921 | Pier et al. ...................... | 239/419 |
| 886,846 | 5/1908 | Nicoll ............................ | 239/466(X) |
| 3,463,601 | 8/1969 | Childree ....................... | 239/406(X) |

*Primary Examiner*—Lloyd L. King
*Assistant Examiner*—Gene A. Church
*Attorney*—Water, Roditi, Schwartz & Nissen ABSTRACT: A gas torch comprises a hollow housing with channels for feeding combustible gas and air to a mixing chamber within the housing. Inside the housing and facing the channels is a nozzle communicating with the gas channel. The periphery of the nozzle is provided with spirallike projections disposed downstream of the air channel to effect primary eddying of the air. At the outlet end of the housing is an outlet nozzle and an additional vortex generator is disposed between the nozzles, the latter vortex generator being formed by threads on the inside walls of the housing.

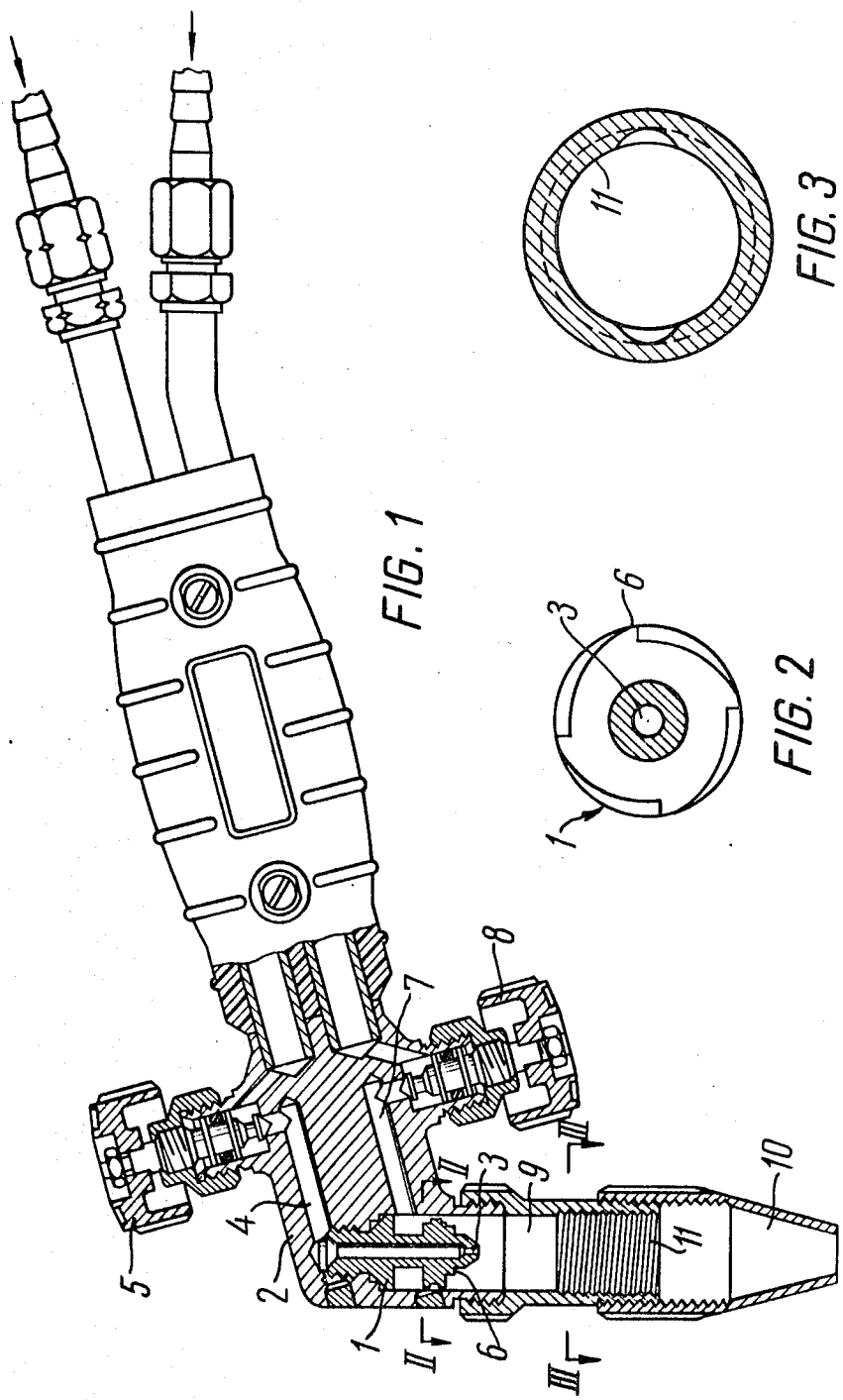

GAS TORCH FOR WELDING PREFERABLY FUSIBLE MATERIALS, SUCH AS PLASTICS AND FOR SOLDERING SOFT ALLOYS

This invention relates to gas torches intended for welding fusible materials, such as plastics, and also for soldering soft alloys.

Known in the art are gas torches for welding plastics wherein provision is made for a mixing chamber, to which the components to be mixed, viz., combustible gas and air, are fed through valves. On leaving the mixing chamber, the gas-air mixture undergoes combustion and the heat evolved heats a coil, through which there passes a gaseous heat carrier, the outlet end of the coil being furnished with a nozzle serving as the torch tip and directing the hot heat carrier to a weld area.

The known gas torches of the aforespecified type are inconvenient in operation, in that they are massive due to the employment of a relatively large coil disposed behind the mixing chamber in the path of the gas-air mixture and, therefore, do not make it possible to obtain flawless welds in areas that are barely accessible. Another disadvantage of the known gas torches is that their open flame is deleterious when the materials to be welded, e.g. plastics, do not withstand high temperatures and, moreover, adversely affects the welder's hands.

It is an object of the present invention to eliminate the aforementioned disadvantages and to provide a gas torch for welding plastics and for soldering soft alloys which is characterized by its relatively simple design its moderate overall dimensions and its avoidance of an open flame.

This object of the invention is accomplished by the provision of a gas torch in which the air delivered to a weld area is heated by the heat evolved during combustion. According to the invention, the gas torch contains a chamber for gas combustion and for mixing the combustion products with the air delivered to the weld area, the gas and air inlet side of said chamber being furnished with a vortex generator.

Air and gas vorticity is conducive to attaining a steady flame having an increased ignition zone and results in a denser burning gas stream and an enhanced combustion rate.

In a preferred embodiment of the present torch, according to the invention, the inner walls of the chamber are threaded with a view to causing the hot and cold components of the gas mixture to undergo vigorous mixing, so that the mixture arriving at the gas torch nozzle will be cooled.

Presented hereinbelow is a description of a specific embodiment of the invention with reference to the accompanying drawing, wherein:

FIG. 1 is a side elevation view, partly in section, of the gas torch;

FIG. 2 is a sectional view taken along the line II–II of FIG. 1; and

FIG. 3 is a sectional view taken along the line III–III of FIG. 1.

The gas torch accommodates a hollow vortex generator 1 (FIG. 1) mounted in a torch casing 2. In the vortex generator 1, provision is made for a spray nozzle 3, to which combustible gas is fed via a channel 4, the rate of gas flow being controlled by means of a valve 5. On the external side of the vortex generator 1, there are disposed guides 6 (FIG. 2) in the form of convolutions, which are intended for imparting vorticity to air fed via a channel 7 (FIG. 1). To control the rate of air flow, use is made of a valve 8. Vortex generator 1 serves the useful purpose of preeddying the air fed to the torch and may have a multiple thread.

The combustible mixture (a mixture of combustible gas and air) then enters a chamber 9, in which there occurs gas combustion and mixing of the combustion products with the air, the chamber below disposed being the vortex generator 1 in the path of the gas-air mixture stream and ahead of nozzle 10 of the torch.

The combustion products mixed with the air (fed in slight excess) arrive at the chamber section, on the walls of which provision is made for a thread 11 (FIG. 3) serving as a second vortex generator, Here the air undergoes eddying and displaces the combustion products towards the axis of the chamber, whereby the chamber walls are isolated from hot combustion products, the latter being entrained in the form of a narrow turbulent stream which is fed to the nozzle 10 mounted on the outlet end of the torch.

The walls of the chamber are cylindrical in shape and the chamber is of a constant diameter throughout its entire length. The torch is, therefore, simple in design, an added advantage being that the gun-type torch is of moderate length.

As the consumption of the air increases, the turbulent gas-air stream which burns in the chamber becomes enveloped with an air layer, so that the chamber walls will be isolated from the burning gas-air stream.

The rotating burning gas-air mixture extends along the chamber axis and, on mixing with the air, emerges from the nozzle 10 at a flow rate of 12—40 m/sec. or greater. The temperature of the stream emerging from the nozzle can be adjusted by varying the amount of the air fed to the torch from an air line, a pressurized air cylinder or a compressor.

The guides 6 of the vortex generator 1 are instrumental in stabilizing the flame and decreasing the noise due to flame.

A test gas torch made according to the present invention makes it possible to adjust the temperature in the 80° to 1,300° C. range at a combustible gas consumption rate (propane-butane mixture) of 25—40 litres per hour. The present gas torch weighs 415 grams maximum.

We claim:

1. A gas torch for welding fusible materials and soldering soft alloys, said torch comprising an elongated housing defining a chamber therein, said housing having opposite ends, an outlet nozzle at one end of said housing communicating with said chamber, an air channel in said housing, a separate channel for combustible gas in said housing, said channels opening into said chamber, and a nozzle body in said chamber communicating with the gas channel for conveying gas from the gas channel to spray the gas into said chamber within the housing, said nozzle body having a peripheral surface with spiral projections thereon disposed downstream of the air channel for producing eddies in the air as it flows to said chamber past the nozzle body, said air and gas being mixed in said chamber and fed to the outlet nozzle for discharge therefrom, said housing having inner walls with a thread disposed upstream of said nozzle and coaxially with said nozzle body to serve as a vortex generator for maintaining the air eddies imparted at the periphery of said nozzle body.

2. A gas torch as claimed in claim 1, wherein said nozzle body has a central portion with an external annular recess facing said air channel.